United States Patent [19]

Hanke et al.

[11] 4,351,167
[45] Sep. 28, 1982

[54] ELASTIC COUPLING OF DISC CONSTRUCTION

[75] Inventors: Wolfgang Hanke; Manfred Schmitt, both of Heidenheim, Fed. Rep. of Germany

[73] Assignee: Voith Getriebe KG, Fed. Rep. of Germany

[21] Appl. No.: 92,208

[22] Filed: Nov. 7, 1979

[30] Foreign Application Priority Data

Nov. 10, 1978 [DE] Fed. Rep. of Germany ....... 2848748
Sep. 14, 1979 [DE] Fed. Rep. of Germany ....... 2937237

[51] Int. Cl.$^3$ ............................ F16D 3/80; F16D 3/14
[52] U.S. Cl. .................................. 464/24; 192/106.2; 464/68
[58] Field of Search ....................... 64/26, 27 C, 27 F; 192/106.1, 106.2, 58 R, 85 R

[56] References Cited

U.S. PATENT DOCUMENTS

| | | | |
|---|---|---|---|
| 1,359,848 | 11/1920 | Techel | 64/26 |
| 2,028,903 | 1/1936 | Griswold | 64/27 C |
| 2,124,013 | 7/1938 | Spase | 192/106.2 |
| 2,127,996 | 8/1938 | Havill | 64/27 C |
| 2,316,820 | 4/1943 | Thelander | 192/106.2 |
| 2,337,134 | 12/1943 | Thelander | 64/26 |
| 2,513,379 | 7/1950 | Thelander | 192/106.2 |
| 2,674,863 | 4/1954 | Thelander | 192/106.2 |
| 4,212,380 | 7/1980 | Billet | 64/27 F |

*Primary Examiner*—Ira S. Lazarus
*Assistant Examiner*—Magdalen Moy

*Attorney, Agent, or Firm*—Ostrolenk, Faber, Gerb & Soffen

[57] ABSTRACT

The disclosure concerns an elastic coupling of disc construction. The coupling has a central disc which is positioned within an inner chamber that is defined by two side discs, and the side discs are joined together at their peripheries. The discs are attached at a hub at their axes. The side discs are of greater circumference than the central disc. A projection extending in from the side discs toward the central disc has circumferentially opposite abutment surface sides. In the central disc, a recess is defined into which the aforesaid projection extends. The recess has opposed abutment surface sidewalls, and each of these abutment surface sidewalls is opposed to a respective abutment surface side on the projection. The resulting pair of displacement chambers defined by the abutment surfaces on the projection and the cooperating abutment surfaces on the central disc are connected by a throttle opening, whereby as one displacement chamber enlarges as the central disc and the side discs rotate with respect to each other, the other displacement chamber correspondingly decreases in volume and fluid will move between the displacement chambers, thereby damping the relative rotation of the discs. There are elastic coupling elements or springs joining the central and side discs. The central disc has a through port that receives the springs of the elastic coupling elements and the side discs have recesses in which the springs are also supported.

17 Claims, 7 Drawing Figures

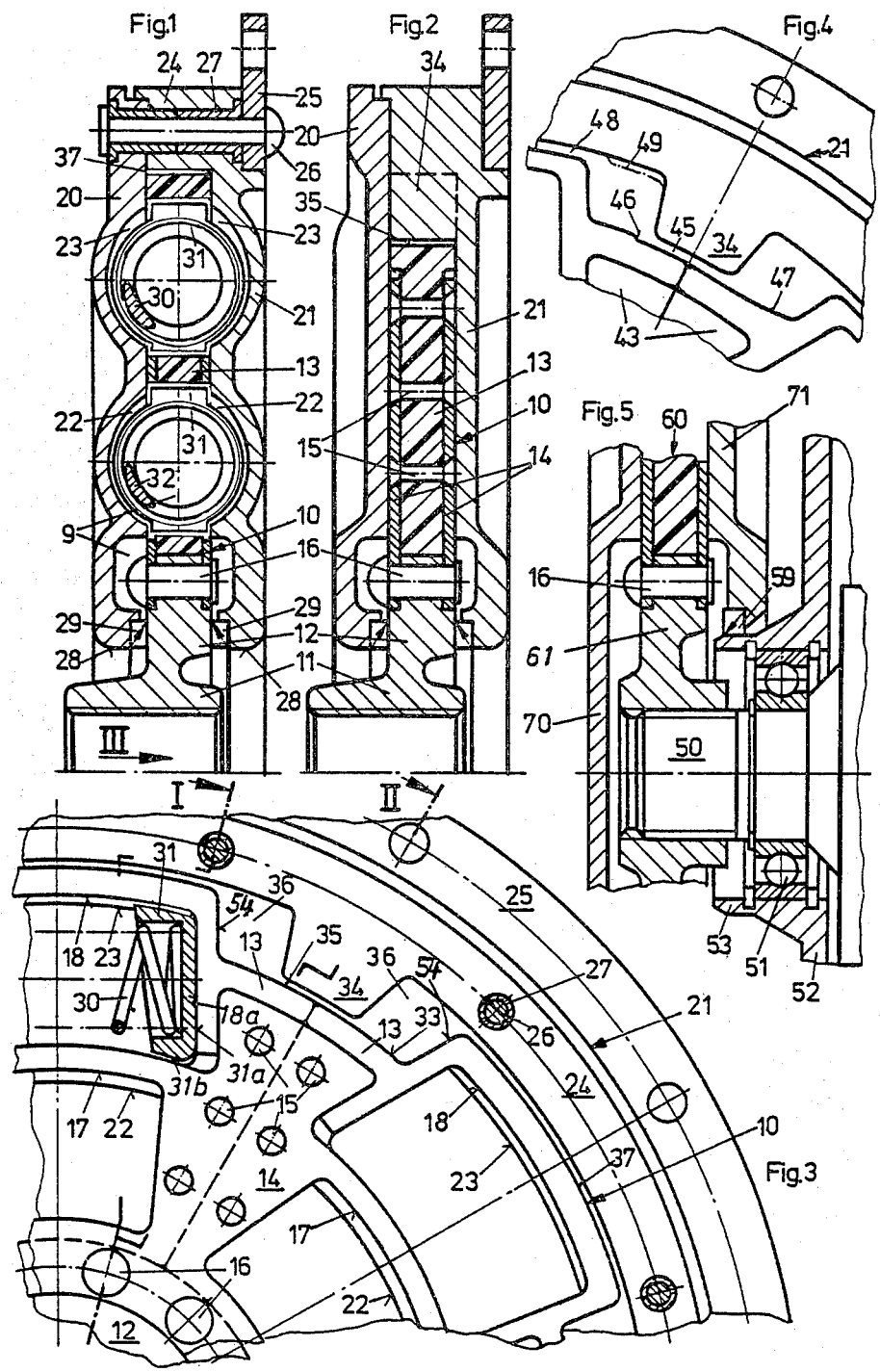

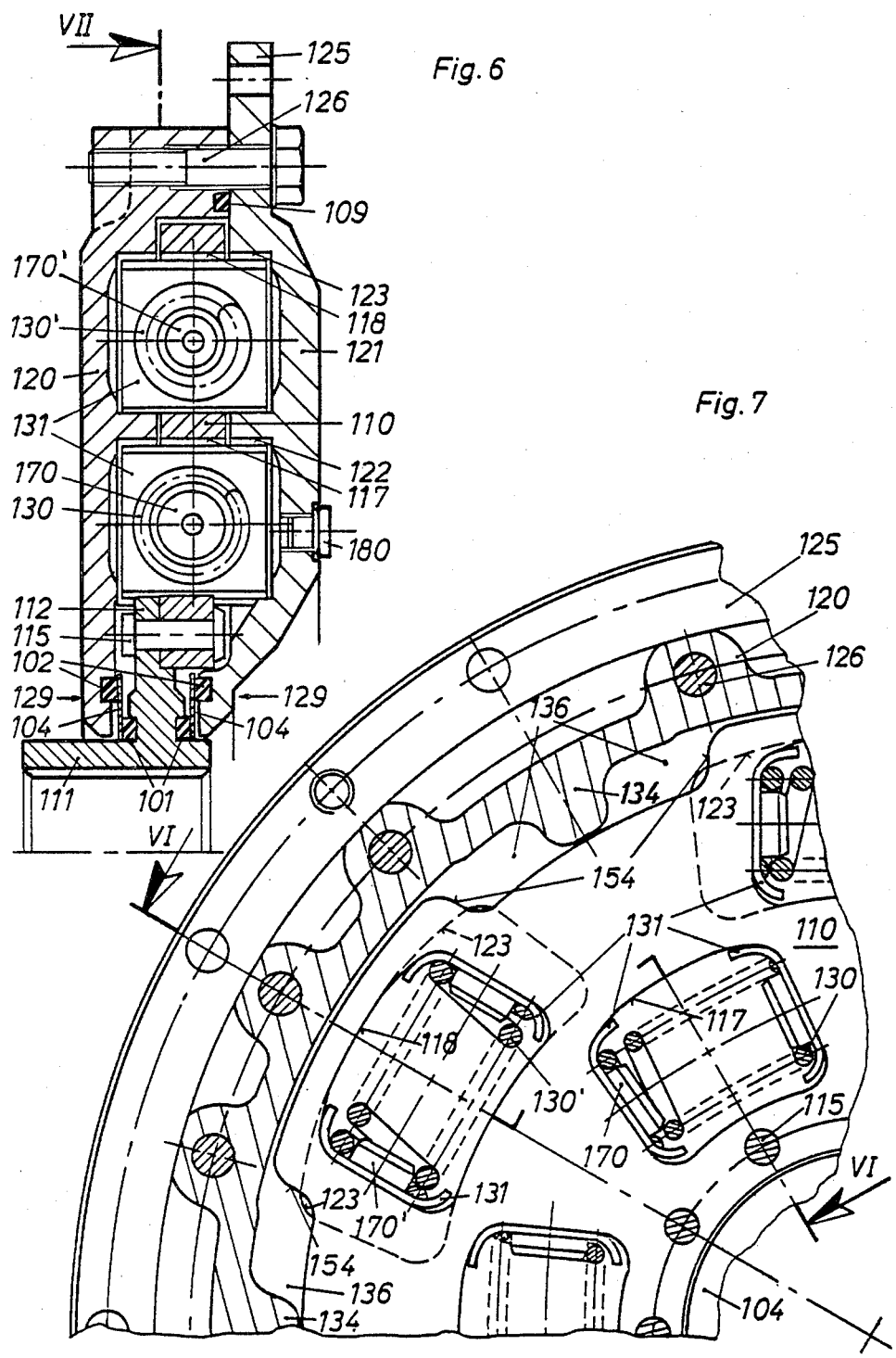

ELASTIC COUPLING OF DISC CONSTRUCTION

BACKGROUND OF THE INVENTION

The invention relates to an elastic coupling of disc construction, and particularly such a coupling of the kind in which one coupling half is comprised of a central disc that is associated with a hub, and the other coupling half is comprised of two side discs which are connected to each other to be rotationally fixed together, wherein the two side discs are arranged on either side of the central disc to enclose the latter at its outer circumference. The side discs are able to rotate by a restricted amount relative to the central disc.

Elastic coupling elements connect the side discs and the central disc for damping relative rotation. In one form, the central disc has a plurality of through ports distributed around its circumference, for accommodating the elastic coupling elements. These elements extend out from the opposite sides of the central disc at the ports, and the elements engage in corresponding recesses in the side discs. The side discs, together with the hub, form an inner chamber that houses the central disc. The inner chamber is substantially fluid-tight and it can be filled with fluid.

At least one displacement chamber is provided which is formed by the two coupling halves. The volume of the displacement chamber varies as the coupling halves counter-rotate. The displacement chamber is able to be filled with fluid. It has a throttle opening for the passage of fluid.

Such couplings are used primarily as torsional oscillation dampers. Frequently, they form part of a motor vehicle clutch. However, they can also be used separately from a clutch. They can also serve purely as a connecting component between an internal combustion engine and a load-switching or "power shift" gear unit. The disc-type construction of the elastic coupling affords the advantage that it requires less space so that the engine and the gear unit can be situated close together.

A coupling of the above-described kind is known from British Pat. No. 637,257 (which is equivalent to U.S. Pat. No. 2,337,134).

The inner chamber of this coupling can be filled with a fluid. In the presence of the fluid, the points at which the parts of the coupling slide over each other are lubricated. With the aid of the fluid, torsional oscillation damping can be obtained. For this purpose, the following provision is made in the known coupling. According to FIGS. 6 to 9 of the above British Patent, small cylinder-piston units are arranged on the helical springs. These form displacement chambers with throttle apertures. Owing to the small total volume of these displacement chambers, their damping effect is relatively slight.

According to FIGS. 1 to 4 of the British Patent, in the inner chamber of the coupling, other displacement chambers 20 are formed by means of extensions 18 and plates 43. However, the damping effect of these displacement chambers is also only slight, since these chambers are open toward the hub 10, whereby the fluid which is to be displaced encounters only slight resistance. This is particularly the case when, over time, the coupling has lost some of the fluid and air has penetrated into the coupling. A fluid loss of this kind can never be fully avoided. When the coupling rotates, the air accumulates in the vicinity of the hub, while the fluid occupies the radially outer region of the inner chamber of the coupling, due to centrifugal force.

The above-described coupling has only inadequate means to restrict the torsion angle. One possibility for this consists in the helical springs 17 "becoming a block", i.e. with their coils resting against one another. However, this reduces the working life of the helical springs. Another possibility consists in the radially inner edges of the extensions 18 striking on the plates 43. Finally, the torsion angle of the coupling can also be restricted by the cylinder-piston units reaching their terminal position. In all three cases, despite the presence of damping fluid, there is a danger of hard impacts, since there is predominantly only line contact between components which strike against each other.

SUMMARY OF THE INVENTION

An object of the invention is to improve the known elastic coupling so that its working life is prolonged, particularly by the avoidance of hard impacts when the fixed stops (torsion angle restriction) becomes effective. At the same time, the coupling should be capable of damping torsional oscillations as strongly as possible.

According to the invention an elastic coupling of the kind specified includes one coupling half comprising a central disc that is associated with a hub and the other coupling half comprising two side discs connected to each other and rotationally fixed to each other. The two side discs are arranged on either side of the central disc and enclose the central disc at the outer circumference of the side discs. The side discs can relatively rotate with respect to the central disc. Elastic coupling elements between the coupling halves damp relative rotation of the coupling halves. These components are received in openings or ports provided in the central disc. The elastic coupling elements also extend outwardly from the sides of the central disc to engage in correspondingly positioned recesses in the side discs. The side discs and the hub together form an inner chamber which houses the central disc and which is substantially fluid-tight. This inner chamber can be filled with fluid. A displacement chamber is defined between the two side discs and by the cooperation between the two coupling halves. The volume of the displacement chamber varies as the discs counter-rotate. The displacement chamber can be filled with fluid. It has a throttle opening for controlling flow of fluid through the chamber, into it and out of it. In the inner chamber of the coupling, there is a projection on one of the coupling halves that extends into the displacement chamber and that has circumferentially opposite first abutment surfaces. There are second abutment surfaces on the other coupling half that are opposed to and normally spaced away from the projection first abutment surfaces. A respective set of first and second abutment surfaces are in and define the boundaries of the displacement chamber. Preferably, the projection and the cooperating abutment surfaces are located at the radially outer region of the inner chamber. The projection and abutment surfaces are so positioned that at a maximum torsion angle, there is substantially surface contact between the engaged abutment surfaces for purposes of forming a fixed stop. Both the elastic coupling elements and the throttle opening control the extent of counter-rotation of the coupling halves until the fixed stop condition is reached.

With the invention, it is possible to form numerous large-volume displacement chambers, which are largely closed off from the vicinity of the hub, in the radially outer region of the inner chamber of the coupling. With the aid of these displacement chambers, torsional oscillations are particularly strongly damped. This is the case even when the coupling has lost some of its fluid content.

An important characteristic of the coupling according to the invention is that the abutment surfaces that serve to restrict the torsion angle are also used to form the largely closed-off displacement chambers. In this way, the displacement chambers not only serve to damp torsional oscillations, but also advantageously damp impact when the fixed stops become effective for restricting the torsion angle. This is achieved mainly in that when the fixed stops become effective, there is substantially surface contact between first and second abutments. This has the effect that when the maximum torsion angle is reached, there is usually no metal contact, since a thin film of fluid is retained between the abutment surfaces. If, nevertheless, there is metal contact when particularly high torques arise, this only occurs after a certain time lag, since the aforesaid film of fluid must first be displaced.

The throttle opening may be defined by a gap in the vicinity of the projection. The throttle opening or gap may be provided between the central disc and the side discs, by appropriately spacing them apart. Although the throttle opening may be of a constant width, the width of the throttle opening can also be varied either over a continuous variation range or stepwise as the torsion angle increases. This can be accomplished by profiling one or the other of the cooperating surfaces of the discs that defines the throttle opening so that as the coupling halves counter-rotate, the cross-section of the resulting throttle opening changes.

In a particularly simple way, variation of the intensity of the torsional oscillation damping is achieved during the counter-rotation of the coupling halves. Provision can be made in particular for the throttle gap to be greatest in the middle position, at the rest position of the coupling, and for the throttle opening to be reduced as the torsion angle increases, so that the intensity of the damping increases correspondingly.

Preferably, the displacement chambers are arranged in pairs so that the fluid is displaced predominantly from one chamber into another chamber of the pair during counter-rotation of the coupling halves.

The elastic coupling elements between the discs may be in the form of springs. Spring plates may be positioned at the opposite ends of the recesses in the side discs which receive the springs. The spring plates may be so fitted in the receiving ports of the central disc and in the recesses in the side discs that further displacement chambers having throttle apertures are formed. These displacement chambers may be used instead of or additional to the displacement chambers formed by said projection and abutment surfaces. They are preferably defined by the rear faces of the spring plates and the surfaces on the ports of the central disc and on the recesses of the side discs which come into contact with them. These means also provide both torsional oscillation damping and impact damping. Impact damping occurs whenever the rear faces of the spring plates come into contact with the relevant surfaces on the central disc or the side discs. As a rule, this occurs more often than the mutual contact between the abutment surfaces at the maximum torsion angle. For this reason, with the above-described measures, a particularly marked reduction in the wear of the spring plates is achieved resulting in an increase in the working life of the coupling.

Other objects and features of the invention will be apparent from the following description considered with reference to the accompanying drawings.

BRIEF DESCRIPTION OF THE DRAWINGS

FIG. 1 is a longitudinal section through a coupling according to the invention, viewed along line I in FIG. 3.

FIG. 2 is a longitudinal section through this coupling, viewed along line II in FIG. 3.

FIG. 3 is a fragmentary view of the coupling, viewed in the direction of the arrow III in FIG. 1, and with one of the side discs of the coupling omitted.

FIG. 4 is a fragmentary view, corresponding to FIG. 3, but showing a modified embodiment of a coupling.

FIG. 5 is a partial longitudinal section through a coupling that has been built onto a gear unit.

FIG. 6 is a longitudinal section through a second modified version of the coupling shown in FIGS. 1 to 3, along the line VI—VI in FIG. 7.

FIG. 7 is a partial section in the direction of the arrow VII in FIG. 6.

DESCRIPTION OF THE PREFERRED EMBODIMENTS

The rotationally-elastic coupling shown in FIGS. 1 to 3 has a central disc 10 and two opposed side discs 20, 21. The central disc 10 is comprised of a flange 12 that is formed on a hub 11. Around the flange there are six, for example, identical disc sectors 13. The disc sections extend radially out from the flange 12 to the below-described recess 33. The junction between two sectors 13 is shown at the radial line, partially dashed, in FIG. 3. These disc sectors can be produced from plastic, particularly a wear resistant plastic, whereby they may be molded. The disc sectors 13 are connected to each other on one or on both lateral sides by means of thin metal side discs 14, with the aid of connecting rivets 15. The metal discs 14 also form the connections between the disc sectors 13 and the flange 12, by means of rivets 16.

The central disc 10 has two circular rows each of six ports, the radially inward ports 17 and the radially outward ports 18, which extend completely through the central disc. Corresponding in both radial and circumferential positions to these ports, respective recesses 22, 23 are provided in the side discs 20, 21. Thus, in the normal way, elastic coupling elements comprised of helical compression springs 30 can be inserted in the ports 17, 18. The springs 30 are positioned between spring plates 31 which engage on both circumferential sides of the springs in the recesses 22, 23. In FIG. 3, only one spring 30 with a spring plate 31 is shown. The other springs and their spring plates are not shown (but compare FIG. 7.)

For rigidly connecting the side discs 20, 21 to each other, a collar 24 is formed on the outer circumference of the side disc 21. In addition, a connecting flange 25 is provided there for connecting that coupling half to another object, not shown. The side discs 20, 21 and the connecting flange 25 are riveted together by rivets 26. The side discs also may be formed of plastic, particularly a wear resistant plastic, whereby they may be molded. If the side discs 20, 21 are produced from lightweight metal castings or from plastic material, it is expedient to insert steel sleeves 27 in the rivet holes.

The side discs 20, 21 each have a central through-bore 28 for the hub 11 and for a shaft, which is not shown, on which the coupling can be pushed via the hub 11. In the vicinity of the hub 11, the side discs 20, 21 lie, via sealing rings 29, against the flange 12 on the central disc 10. This provides a fluid-tight inner chamber 9, which can be filled with a lubricating medium, such as oil, for example. The central disc 10 is in the chamber 9.

A recess, 33 defined at its opposite circumferential ends by abutment surfaces 54 formed on the central disc 10, is provided on the outer circumference of the central disc 10 between each circumferentially adjacent pair of ports 18. A projection 34 formed on the side disc 21,24 projects radially inwardly into the recess 33 to form a mixed stop. In the circumferential direction between the abutment surfaces 54 of the recess 33 and the abutment surfaces defined by the sides of the projection 34, there is a considerable gap. The size of this gap determines the maximum torsion angle of the coupling. In the radial direction, on the other hand, between the recess 33 and the projection 34, there is only a narrow gap 35. The thickness of the central disc 10 in the axial direction of the coupling is almost equal to the clear width between the side discs 20, 21 (see FIGS. 1 and 2).

Two displacement chambers 36 are formed in the recess 33 by the projection 34. The chambers 36 are interconnected substantially only via the gap 35 which acts as a throttle opening. Since the inner chamber 9 of the coupling and thus also the chambers 36 are filled with fluid, the above-described arrangement acts as a device for damping torsional oscillation.

In FIG. 3, the two opposed, radially spaced apart surfaces, which form the throttle gap opening 35 are parts of concentric cylinder casing surfaces. For this reason, the clear width of the throttle opening 35 in this case remains constant during the counter-rotation of the two coupling halves.

A modified embodiment of coupling is shown in FIG. 4. In this case, the throttle opening 45 is relatively wide in the radial direction in the unloaded central position of the coupling. However, the disc sectors 43 appertaining to the central disc 10 are shaped so that the throttle opening 45 becomes smaller in the radial direction when the coupling halves are counter-rotated. The reduction in the size of the throttle opening can be effected stepwise, as shown at 46, or in a continuous curve as shown at 47.

In the coupling shown in FIG. 3, there is an exchange of fluid between the displacement chambers 36 when the two halves of the coupling counter-rotate. Furthermore, fluid can also be displaced through the annular outer throttle gap embodiment of FIG. 4. It is also possible to allow the outer throttle gap 48 in FIG. 4, to become narrower as the torsion angle increases, e.g. as indicated by the curved surface shown as a dashed line.

By means of the spring plates 31 another device for damping torsional oscillation may be formed, which may be used in addition to or instead of the damping device described previously. For this purpose the spring plates 31 are so fitted in the ports 17, 18 of the central disc 10 and in the recesses 22, 23 of the side discs 20 and 21 that they form pistons shifting circumferentially upon relative rotation of the coupling halves. Thus, along with the thickness of the central disc 10 being almost equal to the clear width of the inner chamber between the side discs 20 and 21, displacement chambers are defined as follows:

When the central disc 10 rotates, as seen in FIG. 3, clockwise relative to the side discs 20, 21 then a displacement chamber is formed between the rear face 31a of the spring plate 31 and the surface 18a of the port 18. Accordingly, when the central disc 10 rotates anti-clockwise relative to the side discs 20, 21 then displacement chambers are formed between said rear face 31a and surfaces of the recesses 23 which were hitherto in contact with them. A throttle opening is provided by a gap 31b between the periphery of the spring plate 31 and both port 18 and recesses 23. A further displacement chamber is defined by two spring plates 31 appertaining to a spring 30 and by the port 18 and recesses 23.

The coupling shown in FIG. 5 differs from the coupling embodiment described previously in that the coupling of FIG. 5 can be arranged particularly close to a machine housing, such as a gear unit housing, for example. FIG. 5 shows the drive pin 50 of a gear unit, which is mounted by means of a roller bearing 51 in the gear housing 52. The central disc 60 of the coupling is pushed onto the drive pin 50 at the disc hub 61. The outer side disc 70 in this case is a complete disc, that is, it has no central through-bore and does not need to rest via a seal on the central disc 60. In other respects, the side disc 70 is constructed in the same way as the side disc 20 in FIGS. 1 and 2. The inner side disc 71 differs from the side disc 21 in FIGS. 1 and 2 only in that it does not lie sealed against the central disc 60, but instead is sealed against the bearing housing 53 of the gear unit housing 52 via a shaft sealing ring 59.

FIGS. 6 and 7 show another embodiment of the invention. The central disc 110 is a one-piece component, which is attached by rivets 115 to the flange 112 on the hub 111. The central disc 110 can be produced from steel plate or from a lightweight metal casting. There are two side discs 120 and 121, which can preferably be made from lightweight metal castings and which are connected to each other by screws 126. A connecting flange 125 is attached to one side disc 121. The dividing gap between the side discs 120 and 121 is sealed off by means of a sealing ring 109.

As in FIGS. 1 to 3, the central disc 110 has two annular rows of ports each consisting of six ports, with radially inward ports 117 and radially outward ports 118. The ports 117 in the inner row are disposed offset by half a sector relative to the ports 118 in the outer row. This increases the stability of the central disc. The ports 117 are associated with respective recesses 122 in the side discs 120 and 121. Viewed in the axial direction of the coupling, these recesses have the same dimensions as the ports 117. They are therefore not visible in FIG. 7, because in FIG. 7 the coupling is shown in the unloaded state. Similarly, the ports 118 have respective recesses 123 appertaining to them in the side discs 120 and 121. The recesses 123 are larger in the circumferential direction than the ports 118, as can be seen in broken lines in FIG. 7.

In the ports 117 and 118, and in the recesses 122 and 123, there are two opposed spring plates 131 and between the plates 131, there are helical compression springs 130 or 130', respectively. The radially outermost springs 130' have a larger wire diameter than the innermost springs 130, as seen from FIG. 6. Unlike those in FIGS. 1 to 3, the spring plates 131 are molded from steel plate. In addition, on the facing or opposed sides of two spring plates appertaining to a spring, discs 170 and 170' respectively are attached. These discs project into the springs 130 and 130', respectively, in order to guide them.

In the unloaded state of the coupling shown in FIG. 7, the spring plates 131 of the innermost springs 131 rest both on the side walls of the respective points in the central disc 110 and also on the side walls of the respective recesses in the sides discs 120 and 121. The spring plates 131 of the outermost springs 130', on the other hand, at first rest only against the side walls of the respective ports in the central disc 110. When the coupling is transmitting torque and the two coupling halves are counter-rotating, at first, only the innermost springs 130 are compressed, while the outermost springs 130' are not compressed until a specific rotary angle has been exceeded.

At the outer circumference of the central disc 110, there are opposed abutment surfaces 154 which strike against the sides of inward projections 134 on the side disc 120 when the maximum relative rotary angle of the coupling is reached. For the purpose of damping torsional oscillations, displacement chambers 136 are formed there, which are like those described above in connection with FIGS. 1 to 4. The shapes of the abutment surfaces 154 and the projections 134 differ only slightly from those shown in FIGS. 3 and 4, in that greater transitional radii are provided on the edges in order to make production easier.

There is an aperture disposed in the side disc 121, which is used for filling the coupling with fluid, such as oil, for example. This aperture is closed by a screw 180.

Sealing arrangements 129 are disposed between the side discs 120, 121 and the flange 112 on the hub 111. Each sealing arrangement is constructed as follows. In the flange 112, at a very small distance from the hub 111, an annular groove is provided in which a sealing ring 101, in the form of an O-ring, is inserted. A further O-ring 102 with a greater ring diameter than that of the O-ring 101 is also inserted in an annular groove on the inner face of the side disc 120 or 121, respectively. Between the two O-rings 101 and 102 an intermediate ring 104 is clamped. Ring 104 is a thin-walled disc. The intermediate ring 104 is freely movable in the radial direction within specific limits, so that it rests only on the O-rings 101 and 102. Under the contact force, the O-rings are flattened in the normal way (viewed in cross-section), but the disc 104 is also somewhat deformed. Thus it is assumed, for example, in FIG. 6 that the disc 104 would have assumed the shape of a plate spring in the stress-free state, and would have assumed an at least approximately flat shape when the coupling is assembled. However, the disc 104 can also be flat in the unstressed state and can assume the shape of a plate spring when the coupling is assembled. In either case, it is advantageous to dimension the thickness of the disc 104 so that it is elastically deformable under the contact forces. The greater the deformation which occurs when the disc 104 is clamped in, the greater may be the axial movements of the slide discs 120, 121 relative to the central disc 110, and the greater the angular displacement between these components which may be permitted. Instead of the O-rings 101 and 102, so-called square rings or lip sealing rings may also be used, for example, as well as, under certain circumstances, non-elastic rings, such as carbon sealing rings.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An elastic coupling of disc construction comprising:

a first coupling half comprising a central disc rotatable about an axis;

a second coupling half comprising two side discs arranged on the opposite sides of said central disc; said side discs being connected to each other and being rotationally fixed; said side discs being rotatable with respect to said central disc about an axis; said side discs enclose said central disc at the outer circumference of said side discs, defining an enclosed inner chamber which can be filled with a fluid and which houses said central disc;

elastic coupling elements joining said first and said second coupling halves such that relative rotation of said coupling halves charges said elastic coupling elements, which thereby restrains such relative rotation;

in said inner chamber, a projection being arranged at the radially outer region of said inner chamber and extending generally radially inwardly from and being attached to said side discs; said projection having a first abutment surface thereon facing in one circumferential direction of said one coupling half; said central disc having a recess defined therein which opens generally radially outwardly and in which said projection is received; a second abutment surface being defined at a circumferential side wall of said recess; said first and said second abutment surfaces being shaped and positioned to be in opposition to each other, and at a maximum torsion angle of relative rotation of said coupling halves, said first and said second abutment surfaces being in substantially surface contact;

said discs being dimensioned so that said first and said second abutment surfaces define a radially extending displacement chamber between them, which said displacement chamber is also comprised by said side discs; the volume of said displacement chamber being adapted to vary as said coupling halves counter-rotate, which moves said first and said second abutment surfaces circumferentially with respect to each other;

said discs being shaped to together define a throttle opening for fluid in the vicinity of said projection and between said central disc and said side discs and said throttle opening being defined by said throttle opening defining surface and said radially outwardly facing wall surface; said throttle opening communicating between said displacement chamber and said inner chamber outside said displacement chamber and being shaped to restrict the flow of fluid through itself to retard relative movement between said central and said side discs.

2. The elastic coupling of claim 1, wherein said discs are comprised of wear resistant plastic material.

3. The coupling of claim 1, further comprising a hub at said axis at which said central disc is attached; said hub cooperating with said side discs for enclosing said inner chamber.

4. The elastic coupling of either of claims 1 or 3, wherein said inner chamber is substantially fluid-tight.

5. The elastic coupling of either of claims 1 or 3, wherein said central disc is comprised of a plurality of sectors of a disc, which said sectors are connected to each other to define said central disc.

6. The elastic coupling of claim 5, further comprising a metal disc for connecting said central disc sectors to each other.

7. The elastic coupling of claim 3, wherein one of said side discs includes a through bore at said hub; the other said side disc being a complete disc without such a said through bore.

8. The elastic coupling of claim 3, further comprising a sealing arrangement in the vicinity of said hub between said central disc and at least one said side disc; said sealing arrangement comprising a first sealing ring inserted in said central disc; a second sealing ring inserted in said one side disc; said first and said second sealing rings having different respective ring diameters; a freely movable, elastically deformable, intermediate ring clamped between said first and said second sealing rings.

9. The elastic coupling of claim 8, wherein said intermediate ring is a thin walled spring disc.

10. The elastic coupling of claim 1, wherein said throttle opening defining surface and said radially outwardly facing wall surface are respectively profiled to alter the clear width of said throttle opening as the relative torsion angle of said coupling halves changes.

11. The elastic coupling of claim 10, wherein those said surfaces are profiled to vary the clear width of said throttle opening in a continuous manner.

12. The elastic coupling of claim 10, wherein those said surfaces are profiled to vary the clear width of said throttle opening in a stepwise manner.

13. The elastic coupling of claim 1, wherein said projection has a respective said first abutment surface defined on each of its circumferentially opposite sides, and said first abutment surfaces facing in opposite circumferential directions; the recess having opposite, facing circumferential sides and a respective said second abutment surface for each said first abutment surface being defined on the opposite said circumferential side walls of said recess, whereby a pair of said displacement chambers are defined, and each of said displacement chambers of said pair thereof being defined between a respective one of said first abutment surfaces and the respective one of said second abutment surfaces; said throttle opening joining said displacement chambers of said pair thereof, whereby one said displacement chamber of said pair thereof increases in volume as the other said displacement chamber of said pair thereof decreases in volume.

14. The elastic coupling of claim 1, further comprising a respective port through said central disc for each said elastic coupling element; a corresponding recess in each said disc and associated with each said port; each said port and its said recesses accommodating a said elastic coupling element.

15. The elastic coupling of claim 14, further comprising a respective spring plate in said recesses at each opposite end of said elastic coupling element for bracing said elastic coupling elements with respect to said discs.

16. The elastic coupling of claim 15, wherein said spring plates are so fitted in said ports and in said recesses that additional said displacement chambers having respective said throttle openings are formed by said spring plates and said discs.

17. The elastic coupling of either of claims 1 or 16, wherein in the vicinity of said elastic coupling elements, said central disc having a thickness almost equal to the clear width of said inner chamber between said side discs.

* * * * *